United States Patent [19]
Tsai

[11] Patent Number: 6,075,584
[45] Date of Patent: Jun. 13, 2000

[54] MULTIPLE-RESOLUTION SCANNER

[76] Inventor: Shui-Chuan Tsai, No. 3, Alley 80, Lane 108, Sec. 1, Kuang-Fu Road, Hsin-Chu, Taiwan

[21] Appl. No.: 09/087,328

[22] Filed: May 29, 1998

[51] Int. Cl.[7] .................................................. G03B 27/00
[52] U.S. Cl. ........................... 355/18; 358/474; 358/487; 358/494; 358/497; 250/208.1
[58] Field of Search ..................................... 358/474, 475, 358/487, 494, 497, 483, 482, 425; 250/208.1, 234; 355/18, 55, 66, 84

[56] References Cited

U.S. PATENT DOCUMENTS

| | | | |
|---|---|---|---|
| 5,579,146 | 11/1996 | Hsiao | 358/483 |
| 5,608,537 | 3/1997 | Manabe et al. | 358/487 |
| 5,907,411 | 5/1999 | Han | 358/487 |

*Primary Examiner*—Alan A. Mathews
*Attorney, Agent, or Firm*—Pro-Techtor International Services

[57] ABSTRACT

A multiple-resolution scanner for scanning a scanned object at one of several resolutions, comprising: a scanning device, having a mirror group, a lens group, and a detector group; and a switching device. The mirror group has several mirrors for transmitting light from the scanned object along several light paths that are separate from each other. The lens group has several lenses, which are separately placed in each of the light paths and generate images of the scanned object at the positions of several detectors of the detector group. The number of the light paths, lenses and detectors is the same. The detectors generate electrical signals, which are fed into the switching device for further processing and switching between the electrical signals of the detectors electronically.

13 Claims, 10 Drawing Sheets

MULTIPLE-RESOLUTION SCANNER

BACKGROUND OF THE INVENTION

1. Field of the Invention

The present invention relates to a multiple-resolution scanner, particularly to a multiple-resolution flatbed scanner which offers at least two resolutions switchable without any mechanical movement.

2. Description of Related Art

Conventionally, text and image data of different types are read by scanners of different resolutions and with different scanning areas. For example, normal text is usually read from an A4 area with a resolution of 300 dpi. For color photographs, 4 inch and 600 dpi are regularly used values for linear size and resolution. Slides and negative films require a resolution of 1200 dpi for satisfactory results, but typically only a linear size of about one inch.

Conventional scanners aim at only one application for a certain image data type. Most scanners on the market are designed for A4 areas at a comparatively low resolution. For scanning photographs, scanners with a smaller scanned area and higher resolution are available. Any user purchasing a scanner needs to consider the intended application and decide which type of scanner is most suitable. For different applications, several scanners are needed, which is not convenient.

For overcoming the deficiency of only one application of conventional scanners, scanners offering multiple resolutions have appeared on the market. For example, Taiwan patent no. 232398 "Multiple lens switching system" discloses a multiple resolution image reading system. By switching between lenses with various focal lengths, the resolution is varied. The lenses are alternatively moved in front of a single CCD detector, so as to obtain different resolutions.

However, a conventional multiple resolution scanner requires, apart from a plurality of lenses, a mechanism for driving a mechanical movement of the lenses as well as enough space to allow the lenses to be switched back and forth. This leads to a large volume of a conventional multiple-resoution scanner.

SUMMARY OF THE INVENTION

It is therefore the main object of the present invention to provide a multiple-resolution scanner with reduced volume, so as to save space.

Another object of the present invention is to provide a multiple-resolution scanner which allows to switch resolutions without mechanically moving the lenses, so as to simplify the structure.

A further object of the present invention is to provide a multiple-resolution scanner which allows to switch between various data types.

The present invention can be more fully understood by reference to the following description and accompanying drawings.

DETAILED DESCRIPTION OF THE PREFERRED EMBODIMENTS

The present invention is a multiple-resolution scanner, particularly a multiple-resolution flatbed scanner which offers various resolutions for various types of image data, like text on an A4 format, color photographs and films.

As shown in FIGS. 1–7, the multiple-resolution scanner of the present invention in a first embodiment mainly comprises: a main body 10 with a top side; a carrier 20, mounted on the top side of the main body 10, for carrying a scanned object 21, with a longitudinal and a transverse axis running parallel to the carrier 20; a scanning device 30, which is movable within the main body 10 along the longitudinal axis; and a rail 11 for guiding the scanning device 30 along the longitudinal axis.

Figure 1:
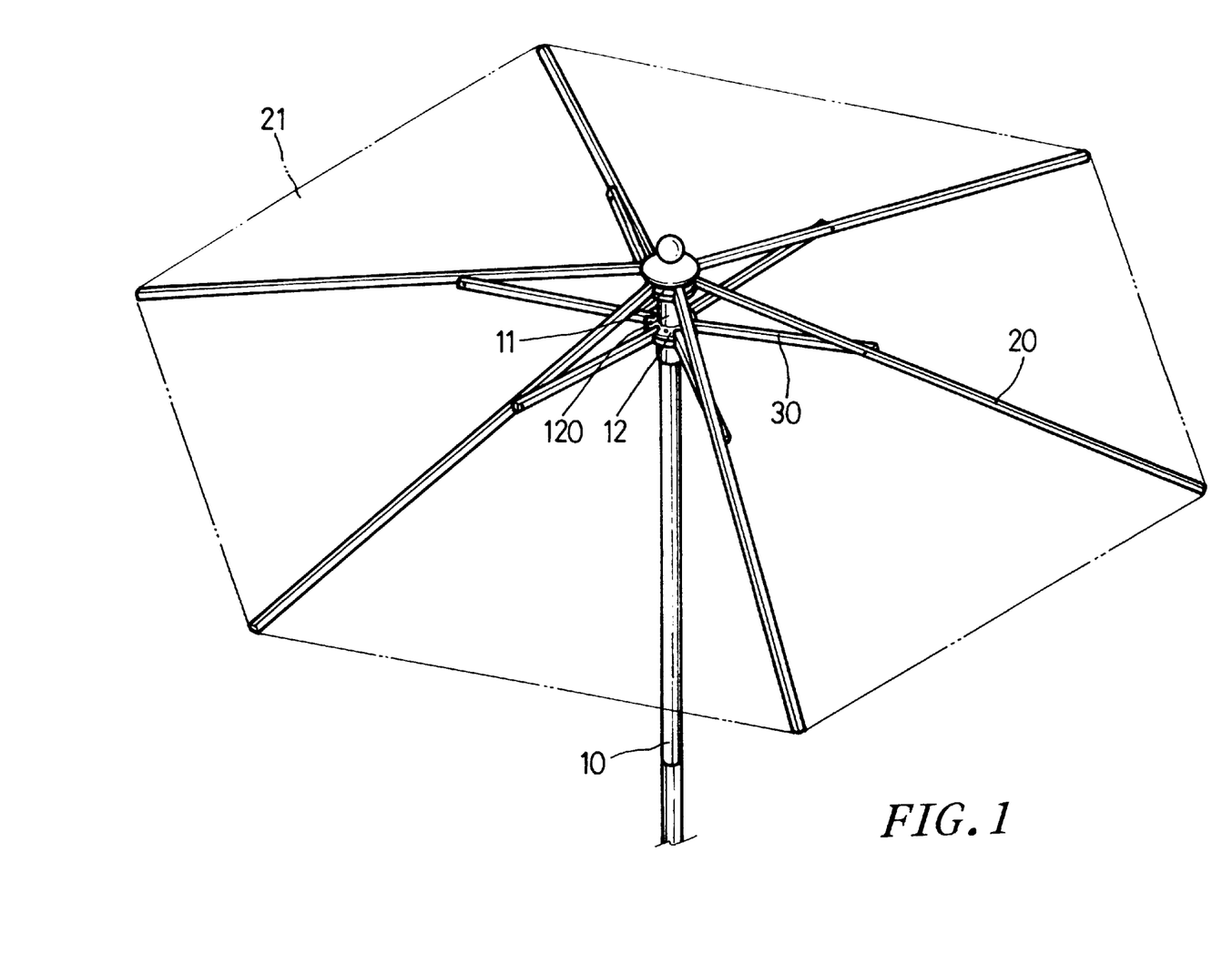
FIG. 1 is a side view of the scanner of the present invention in the first embodiment.

Referring to FIG. 1, the carrier 20 has a transparent plate 22 and a cover 23 for covering the transparent plate 22 and holding the scanned object 21 thereon. The scanned object 21 is a text or image sheet. The scanning device 30 comprises a casing 31, a mirror group 40, a lens group 50, a detector group 60, and a first light source 70.

Figure 2:
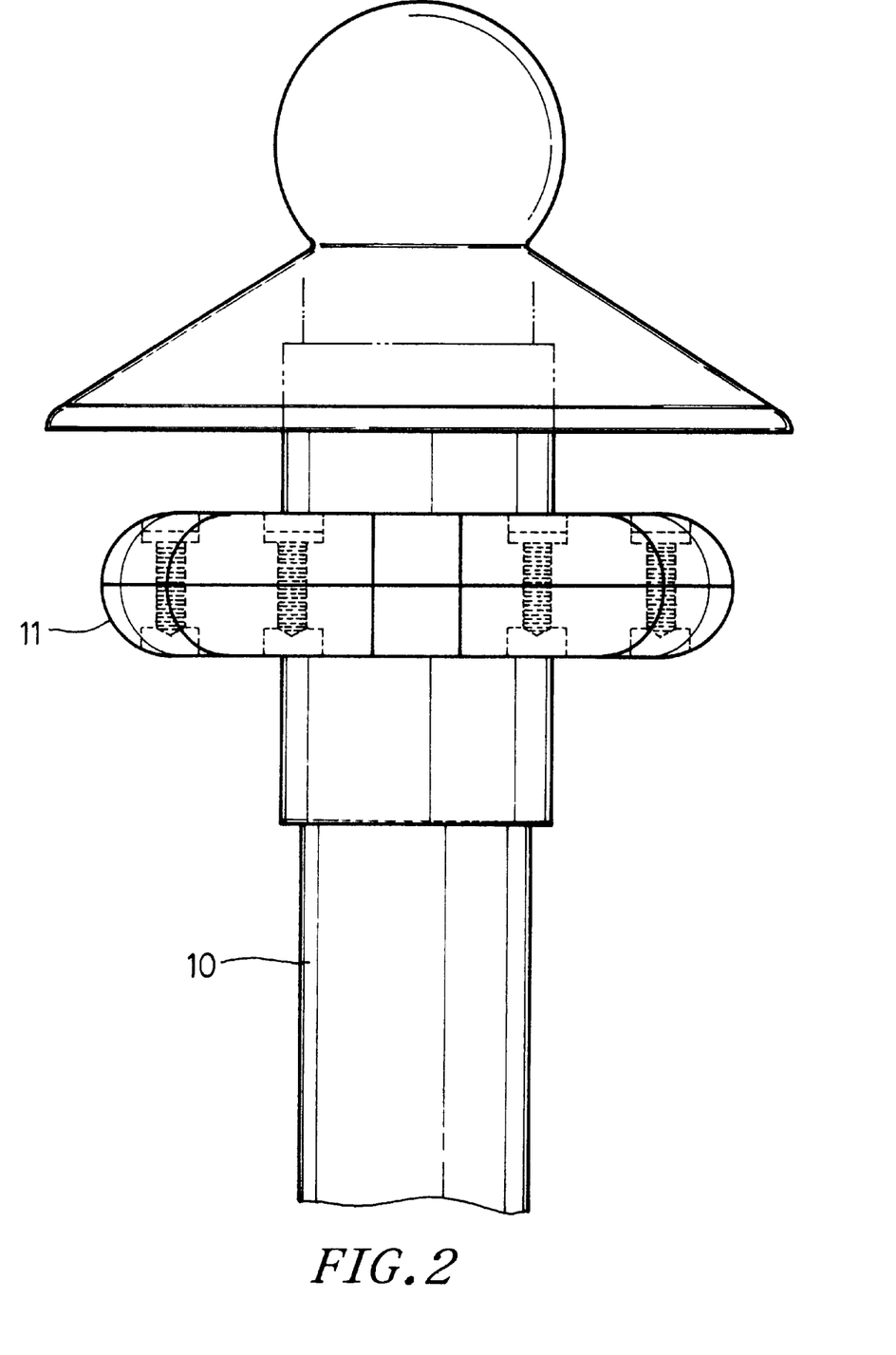
FIG. 2 is a top view of the scanner of the present invention in the first embodiment at the lowest resolution.

As shown in FIGS. 1 and 2, the mirror group 40 consists of several different mirrors. Light 71 generated by the first light source 70 illuminates the scanned object 21, is reflected therefrom and subsequently reflected on the mirrors of the mirror group 40, proceding on various light paths, as further explained below. The lens group 50 comprises several lenses 51, 52, 53 with different focal lengths, which are positioned in the various light paths and generate optical images of the scanned object 21 on the detectors of the detector group 60.

As shown in FIGS. 2–7, the present invention in the first embodiment offers three resolutions, a lowest, a medium and a highest resolution. As shown in FIG. 2, the lenses 51, 52, 53 of the lens group 50 are mounted on a transverse holder 32 within the casing 31. The lenses 51, 52, 53 have mutually different focal lengths to obtain the three different resolutions. Thus the lenses 51, 52, 53 require different light paths and optical distances to the scanned object 21 to produce images thereof on the detectors of the detector group 60. The mirrors of the mirror group 40 prvide for the various light paths.

Usually, scanned objects with a relatively large area, like text sheets and large images, need only relatively low resolutions, whereas scanned objects that require relatively high resolutions, like photographs and films, are smaller. The lens 51 of the lens group 50 provides the lowest resolution and is located in a middle transverse position on the holder 32. In this position, the lens 51 generates an image of an object in a symmetrical transverse position on the carrier 20, being able to cover fully the width of the carrier 20 and to create an image of a large scanned object 21. For the middle and the high resolution, the scanned object 21 is smaller, taking less than the full width of the carrier 20. The lenses 52, 53 are designed to create images of smaller scanned objects 21 at the medium and highest resolutions and are mounted to the two sides of the lens 51 on the holder 32, covering only partly the width of the carrier 20, which is sufficient.

Referring to FIGS. 2–7, the mirror group 40 consists of mirrors 41, 42, 43, 44 and three further mirrors 45, 46, 47, which are located in the same transverse positions as the lenses 51, 52, 53, respectively. The detector group 60 consists of three detectors 61, 62, 63, which are located in the same transverse positions as the lenses 51, 52, 53, respectively.

Figure 3:
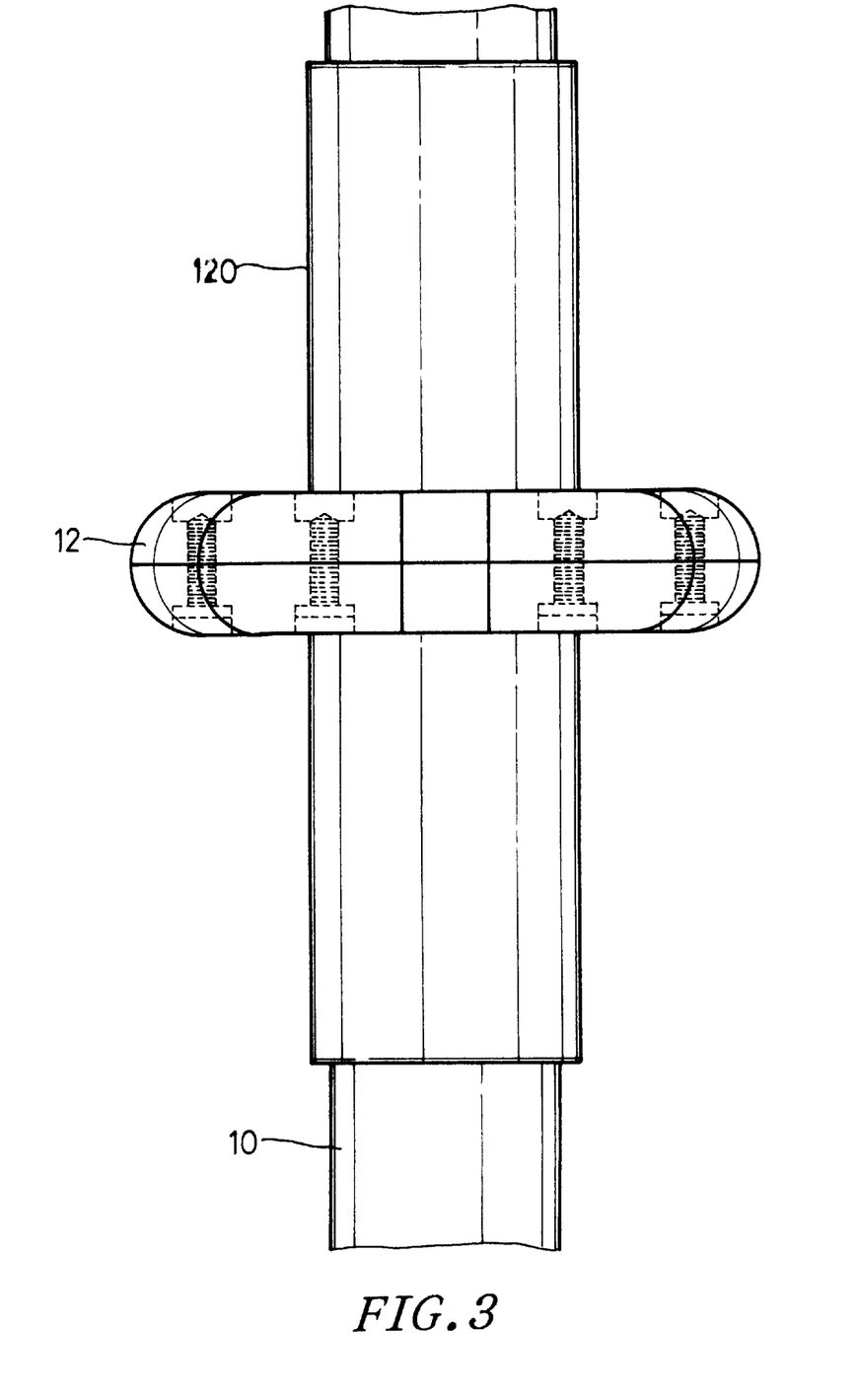
FIG. 3 is a cross-sectional view of the scanner of the present invention in the first embodiment at the lowest solution.

Referring to FIGS. 2 and 3, in the lowest resolution, light from the scanned object 21 passes through the mirrors 41, 42, 43, 44 and then through the mirror 45 to the lens 51. The lens 51 generates an image of the scanned object on the detector 61, wherein a light path 81 is followed, as marked by dotted lines in FIGS. 2 and 3. For the lowest resolution, the section of the light path 81 between the scanned object 21 and the imaging lens has to be comparatively long, so a relatively large number of mirrors of the mirror group 40 is employed for a relatively large number of reflections. Thus the scanned object 21 is allowed to be relatively large.

Figure 4:
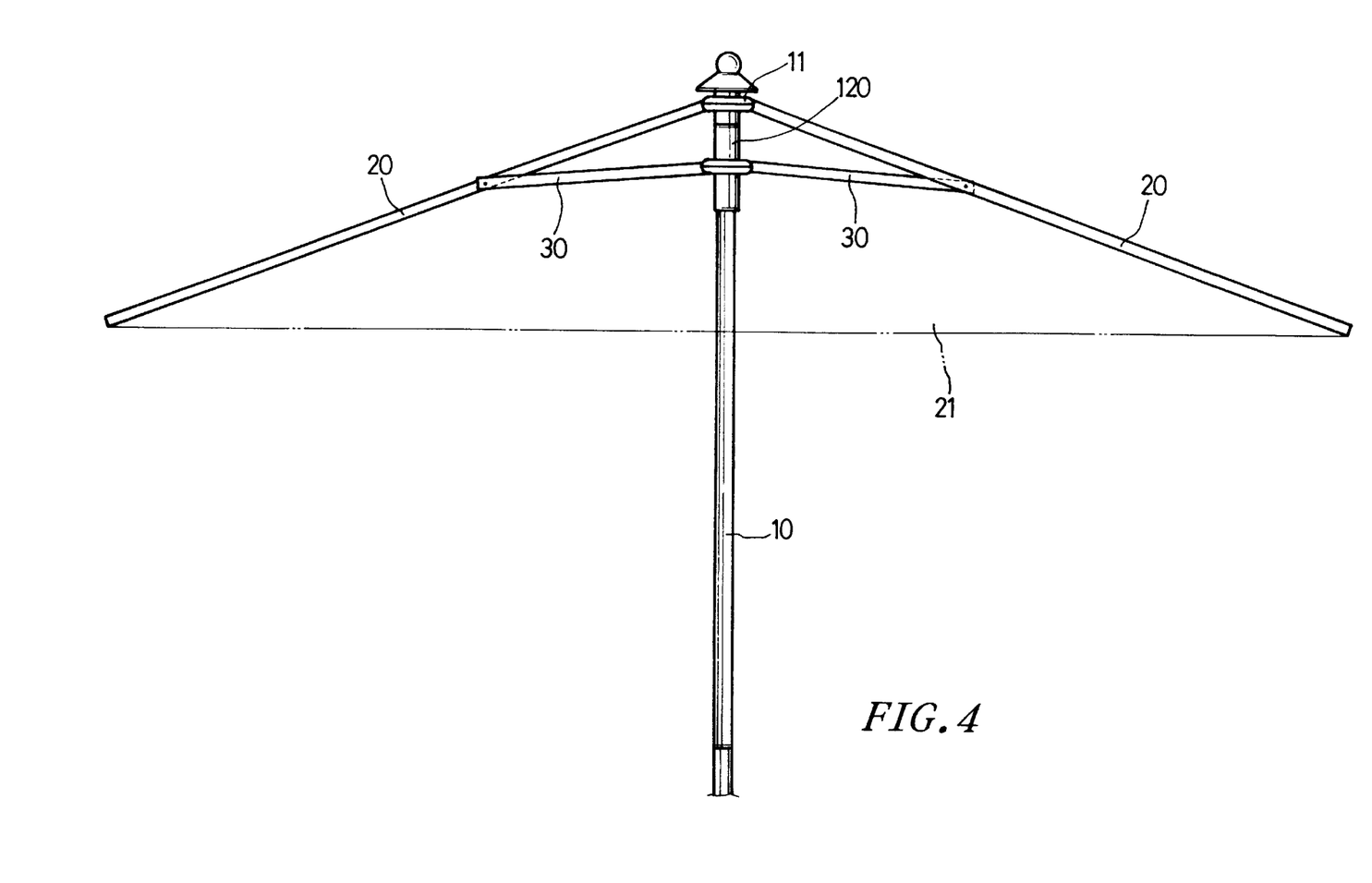
FIG. 4 is a top view of the scanner of the present invention in the first embodiment at the medium resolution.
Figure 5:
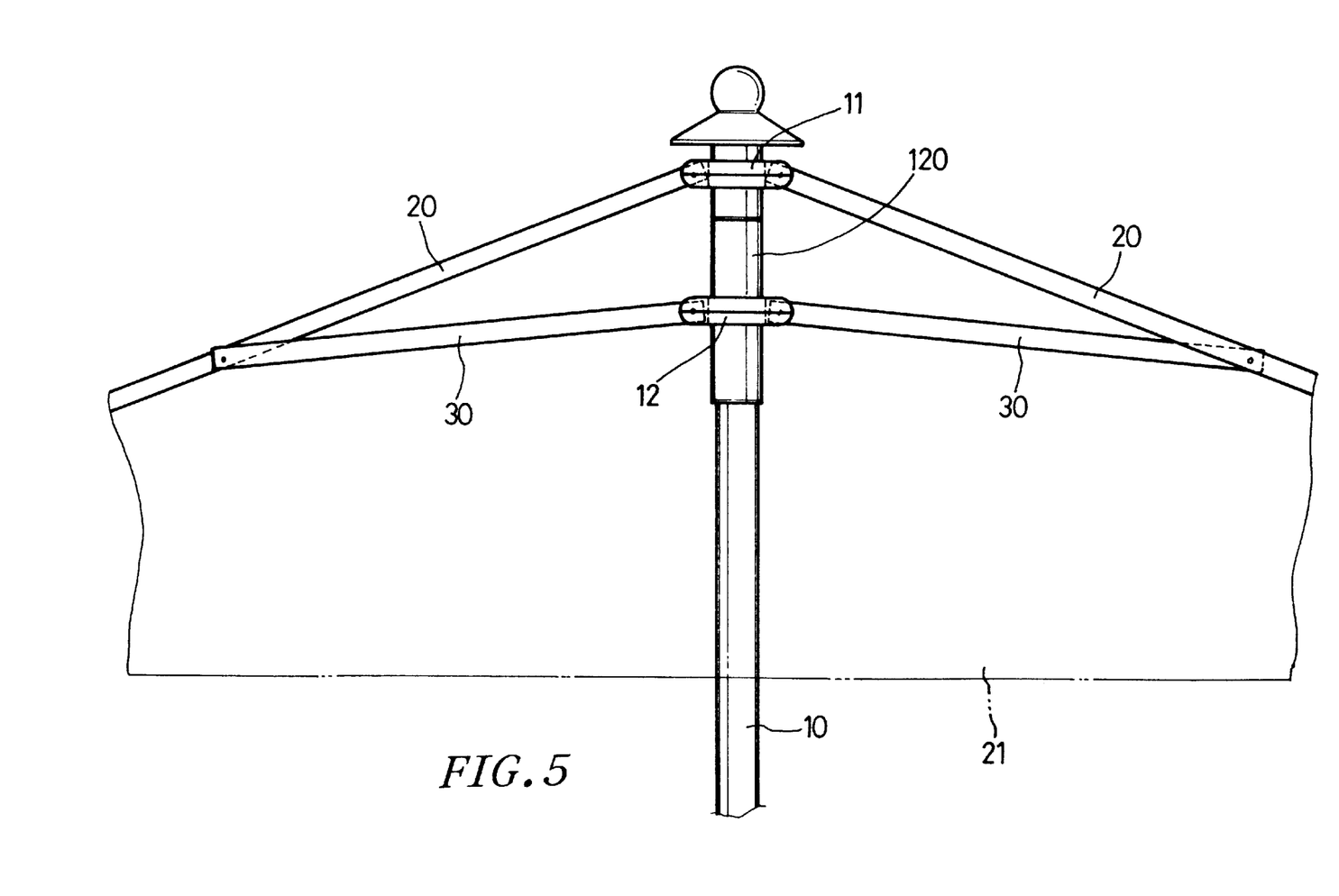
FIG. 5 is a cross-sectional view of the scanner of the present invention in the first embodiment at the medium resolution.

Referring to FIGS. 4 and 5, in the medium resolution, light from the scanned object 21 passes through the mirrors 41 and 42, being reflected twice thereon. Then the mirror 46 reflects the light on the lens 52. The lens 52 generates an image of the scanned object on the detector 62, wherein a light path 82 is followed. For the medium resolution, the section of the light path 82 between the scanned object 21 and the imaging lens is shorter than for the lowest resolution and undergoes less reflections on the mirrors of the mirror group 40.

Figure 6:
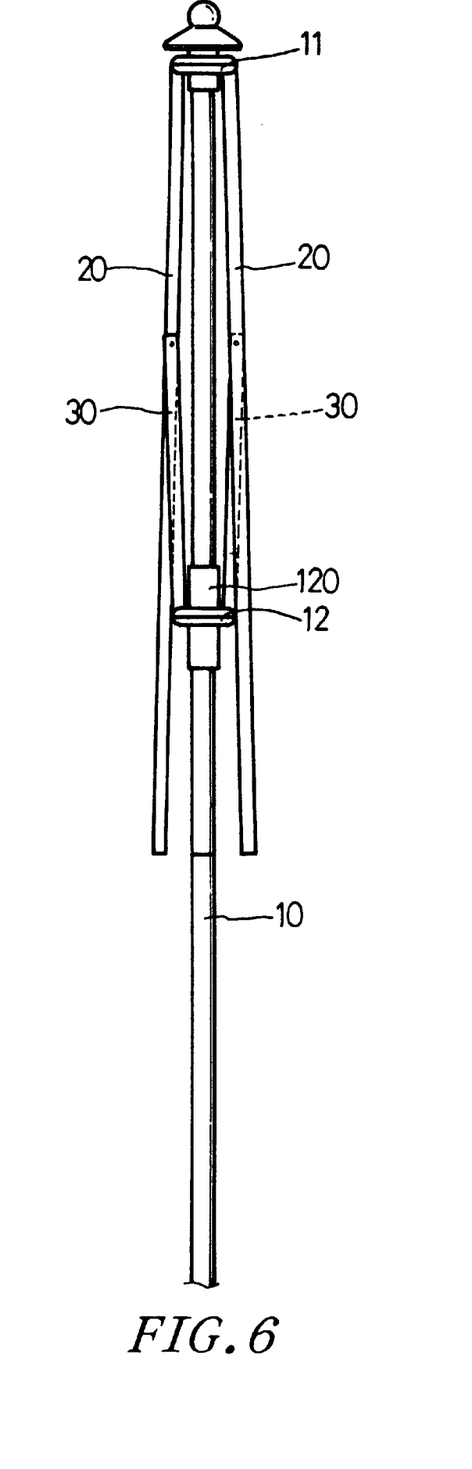
FIG. 6 is a top view of the scanner of the present invention in the first embodiment at the highest resolution.
Figure 7:
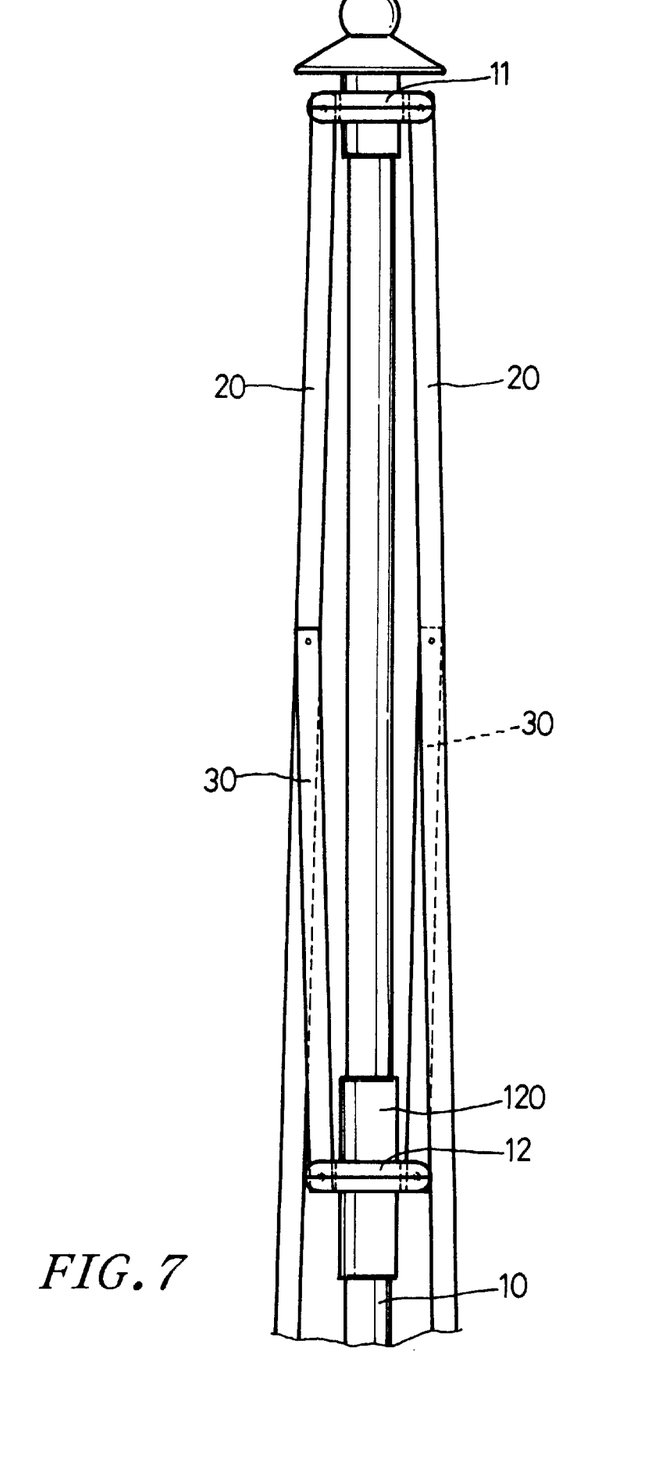
FIG. 7 is a cross-sectional view of the scanner of the present invention in the first embodiment at the highest resolution.

Referring to FIGS. 6 and 7, in the highest resolution, light from the scanned object 21 passes through the mirrors 41 and 42, being reflected thereon only once. Then the mirror 47 reflects the light on the lens 53. The lens 53 generates an image of the scanned object on the detector 63, wherein a light path 83 is followed. For the highest resolution, the section of the light path 83 between the scanned object 21 and the imaging lens is shortest of all resolutions, with a minimum number of reflections on the mirrors of the mirror group 40.

Since for a step motor control single or multiple step widths are equal to the distance of pixels at the lowest resolution used (e.g. ¹⁄₆₀₀ inch), different resolutions are arranged as multiples of each other, like 1:2:3 or 1:2:4. Thus resolutions of 300 dpi, 600 dpi and 1200 dpi or, in another arrangement, of 400 dpi, 800 dpi and 1200 dpi are used. Therefore, the lenses 51, 52, 53 of the present invention operate with resoultions of similar proportions.

The main characteristic of the present invention is the use of three detectors 61, 62, 63. The detectors 61, 62, 63 are charge coupled devices (CCD), which generate electrical signals according to the linear distribution of the received light intensity. As shown in FIGS. 2, 4 and 6, the detectors 61, 62, 63 are mounted at the same transverse positions as the lenses 51, 52, 53, respectively, receiving light coming along the light paths 81, 82, 83, respectively. So for each resolution a separate detector is employed.

Figure 12:
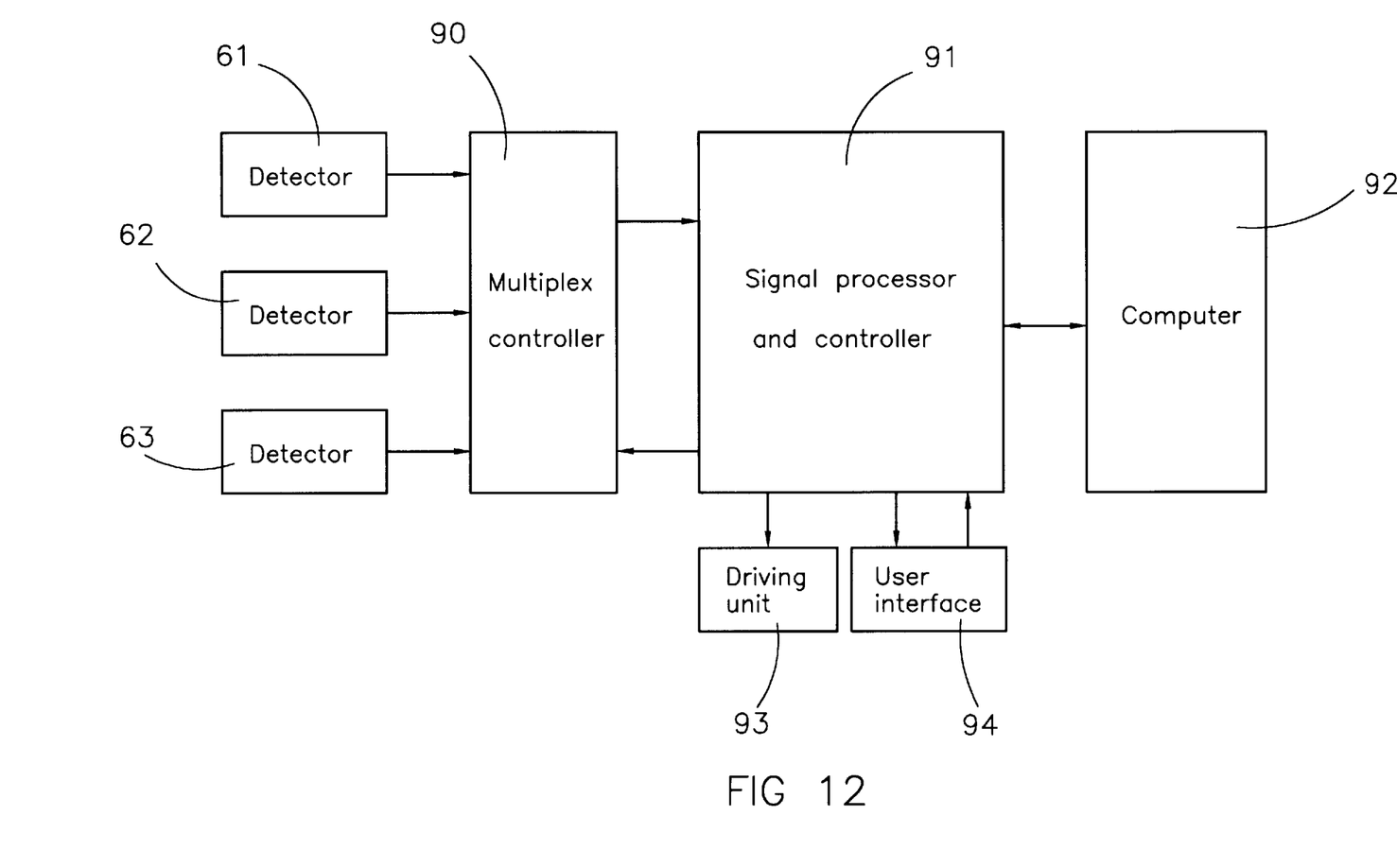
FIG. 12 is a block diagram of the electric circuit of the present invention.

Referring to FIG. 12, a multiplex controller 90 controls the detectors 61, 62, 63, passing the electrical signals from there to a signal processor and controller 91. The signal processor and controller 91 is connected to a computer 92 for further processing, a user interface 93 for user control, and a driving unit 94 for driving the scanning device 30.

The multiplex controller 90 is operated manually by direct user commands via the user interface 94 or automatically by software running on the computer 92. Furthermore, the multiplex controller 90 is usable as a direct switch for turning the detectors 61, 62, 63 on and off, as required.

Since the lenses 51, 52, 53 of the present invention generate images with different resolutions on the separate detectors 61, 62, 63, switching between the different resolutions is accomplished by merely electrically controlling the detectors 61, 62, 63 using the multiplex controller 90. No mechanical movement of the lenses 51, 52, 53 and of the mirrors of the mirror group 40 is required to switch the resolutions. No space and no mechanical driving system need to be provided to allow the lens group 50 to move, simplifying the scanning device 30 and reducing the size thereof.

Figure 8:
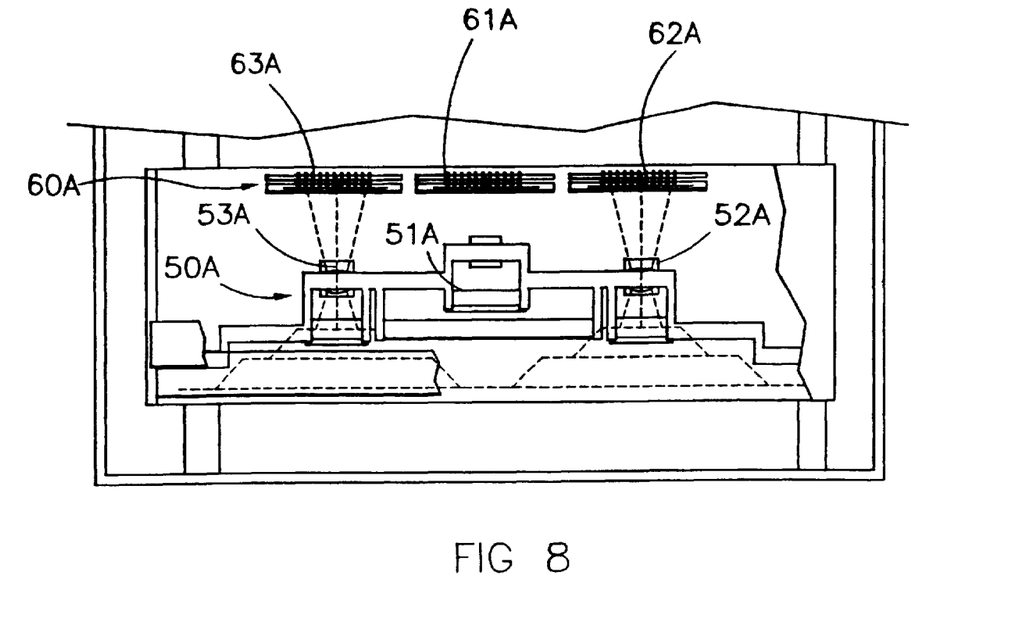
FIG. 8 is a top view of the scanner of the present invention in the second embodiment.

Referring to FIG. 8, the multiple-resolution scanner of the present invention in a second embodiment has a lens group 50A with a lens 51A for a low resolution placed in a middle transverse position and lenses 52A, 53A for a high resolution placed on both sides of the lens 51A. The lenses 52A and 53A have equal focal lengths, thus generating images of the scanned object 21 with equal resolutions. Whereas the lens 51A for the low resolution is used to scan the whole width of the carrier 20, the lenses 52A and 53A are each used to scan the width of the carrier 20 partly at equal resolutions, together covering the whole width of the carrier 20. The images scanned using the lenses 52A, 53A are afterwards combined electronically to yield a single image.

Figure 9:
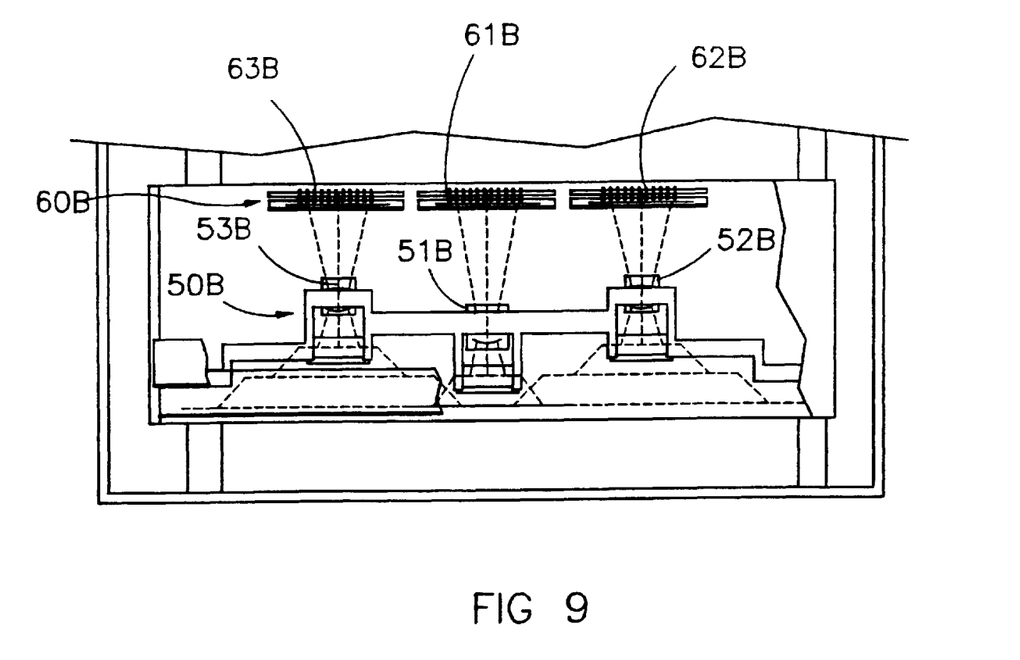
FIG. 9 is a top view of the scanner of the present invention in the third embodiment.

Referring to FIG. 9, the multiple-resolution scanner of the present invention in a third embodiment has a lens group 50B with a lens 51B for a high resolution placed in a middle transverse position and lenses 52B, 53B for a low resolution placed on both sides of the lens 51B. The lenses 52B and 53B have equal focal lengths and are used to scan the area of the carrier 20 partly on the sides at the low resolution. The lens 51B is used to scan a central part of the area of the carrier 20 at the high resolution. The lenses 52B, 53B together cover the whole width of the carrier 20. The images scanned using the lenses 52B, 53B are afterwards combined electronically to yield a single image.

Figure 10:
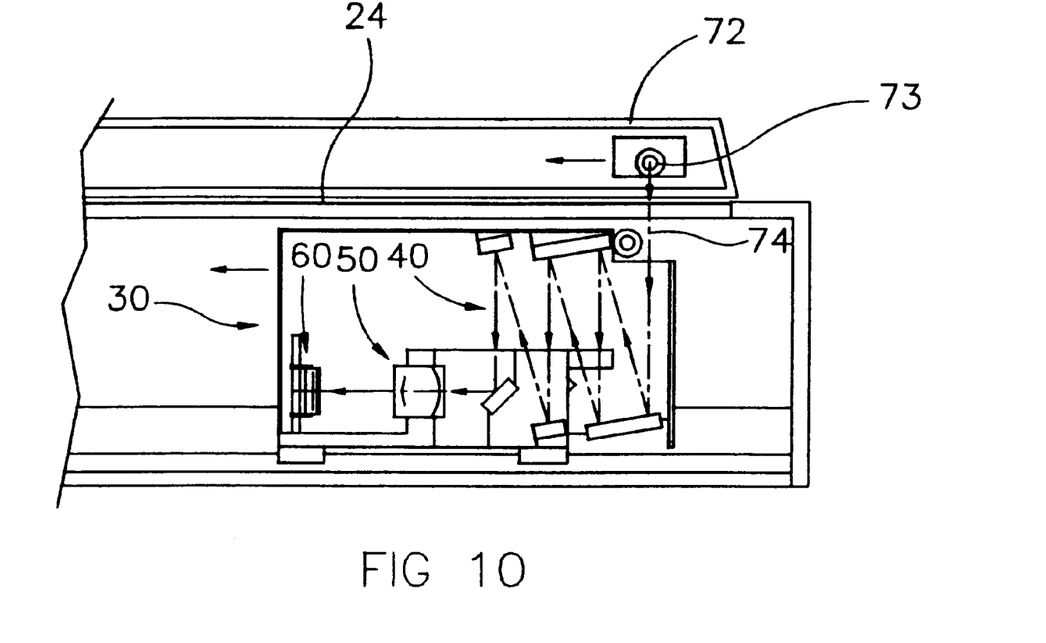
FIG. 10 is a side view of the scanner of the present invention in the fourth embodiment.

Referring to FIG. 10, the multiple-resolution scanner of the present invention in a fourth embodiment has a transmission light source 72, replacing the cover 23 of the first embodiment. Inside the transmission light source 72, a second light source 73 is mounted, which moves longitudinally along with the scanning device 30. The second light source 73 generates transmission light 74, which passes through a scanned transparent object 24 on the transparent plate 22 of the carrier 20. The light 74 is then reflected by the mirror group 40, passes through the lens group 50 and is registered by the detector group 60.

Figure 11:
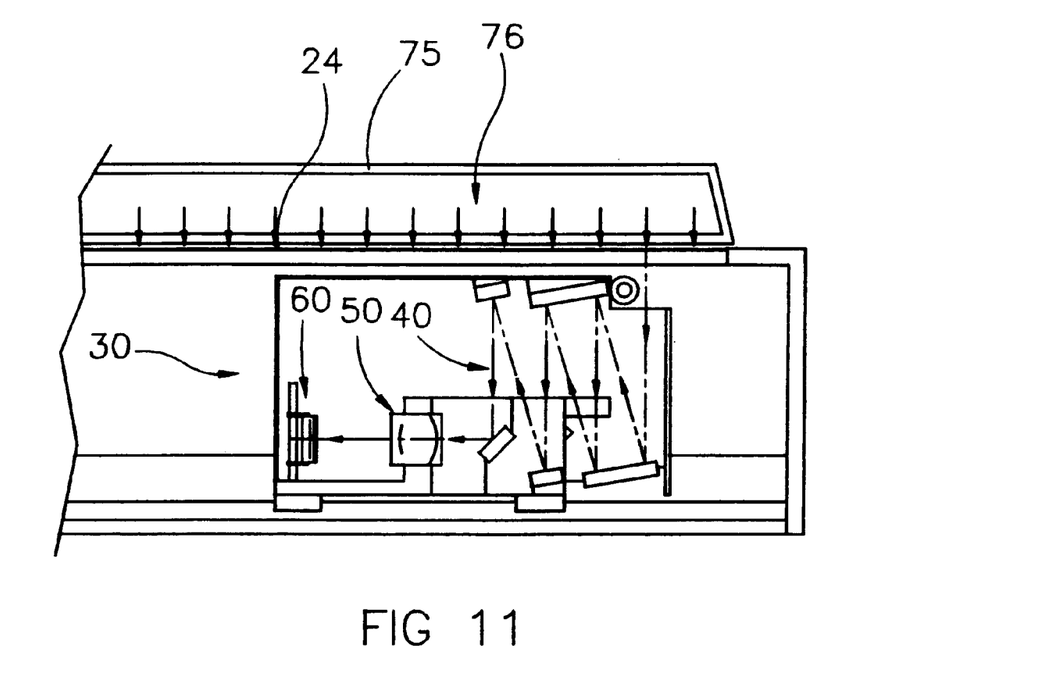
FIG. 11 is a side view of the scanner of the present invention in the fifth embodiment.

Referring to FIG. 11, the multiple-resolution scanner of the present invention in a fifth embodiment has a transmission light source 75 with a light box 76, The light box 76 is an extended light source, which does not move. The light box 76 generates light, which passes through the scanned transparent object 24.

While the invention has been described with reference to preferred embodiments thereof, it is to be understood that modifications or variations may be easily made without departing from the spirit of this invention which is defined by the appended claims.

I claim:

1. A multiple-resolution scanner for scanning a scanned object at one of several resolutions, comprising:

a scanning device, further comprising a mirror group having several mirrors for transmitting light from said scanned object along several light paths that are separate from each other, a lens group having several lenses, one of said lenses placed in each of said light paths, for generating images of said scanned object at several image positions, and a detector group having several detectors, one of said detectors placed at each of said images positions, said detectors generating electrical signals; and a switching device, passing said electrical signals of at least one of said detectors to a signal processing unit for further processing and switching between said electrical signals of said detectors electronically.

2. A multiple-resolution scanner according to claim 1, wherein said lenses generate images at different resolutions, with a low resolution lens located in a central position and generating an image with minimum resolution.

3. A multiple-resolution scanner according to claim 1, wherein said lenses generate images at different resolutions, with a high resolution lens located in a central position and generating an image with maximum resolution.

4. A multiple-resolution scanner according to claim 1, wherein said lenses generate images at different resolutions, which are related to each other like small integer numbers.

5. A multiple-resolution scanner according to claim 1, wherein said electrical signals of at least two of said detectors are combined electronically to yield data of a single image.

6. A multiple-resolution scanner according to claim 1, further comprising at least one first light source, having one reflection light source generating light, which is reflected from said scanned object on said mirror group and from there passed on to said several lenses.

7. A multiple-resolution scanner according to claim 1, further comprising at least one second light source, having at least one transmission light source generating light, which is transmitted through said scanned object on said mirror group and from there passed on to said several lenses.

8. A multiple-resolution scanner according to claim 7, wherein said second light source moves along with said scanning device.

9. A multiple-resolution scanner according to claim 7, wherein said second light source is a light box.

10. A multiple-resolution scanner according to claim 1, wherein said switching device has a multiplex controller between said detector group and said signal processing unit.

11. A multiple-resolution scanner according to claim 10, wherein said multiplex controller is a control switch.

12. A multiple-resolution scanner according to claim 10, wherein said multiplex controller is controlled by software.

13. A multiple-resolution scanner according to claim 10, wherein said multiplex controller is controlled by at least one switch.

* * * * *

UNITED STATES PATENT AND TRADEMARK OFFICE
CERTIFICATE OF CORRECTION

PATENT NO. : 6,075,584
DATED : June 13, 2000
INVENTOR(S) : SHUI-CHUAN TSAI

It is certified that error appears in the above—identified patent and that said Letters Patent is hereby corrected as shown below:

Sheets 1-7 of the drawings are replaced with the following four sheets showing Figs. 1-7.

Signed and Sealed this

Twenty-second Day of May, 2001

*Attest:*

NICHOLAS P. GODICI

*Attesting Officer*    *Acting Director of the United States Patent and Trademark Office*